US012804448B2

(12) United States Patent

Pfaller et al.

(10) Patent No.: US 12,804,448 B2

(45) Date of Patent: Nov. 17, 2026

(54) METHOD AND SYSTEM FOR TRANSMITTING DATA PACKETS

(71) Applicant: AUDI AG, Ingolstadt (DE)

(72) Inventors: Daniel Pfaller, Wettstetten (DE); Heiko Zscharnack, Geisenfeld (DE); Johannes Lang, Poxdorf (DE)

(73) Assignee: AUDI AG, Ingolstadt (DE)

( * ) Notice: Subject to any disclaimer, the term of this patent is extended or adjusted under 35 U.S.C. 154(b) by 86 days.

(21) Appl. No.: 19/051,526

(22) Filed: Feb. 12, 2025

(65) Prior Publication Data

US 2025/0261031 A1 Aug. 14, 2025

(30) Foreign Application Priority Data

Feb. 12, 2024 (DE) ..................... 10 2024 103 847.0

(51) Int. Cl.

*H04W 28/02* (2009.01)

*H04L 67/12* (2022.01)

(52) U.S. Cl.

CPC ......... *H04W 28/0231* (2013.01); *H04L 67/12* (2013.01)

(58) Field of Classification Search

CPC ........................... H04W 28/0231; H04L 67/12

USPC ......................................... 709/201, 226, 238

See application file for complete search history.

(56) References Cited

U.S. PATENT DOCUMENTS

| | | | | | |
|---|---|---|---|---|---|
| 11,659,015 | B2 * | 5/2023 | Long | G06F 16/172 | 709/231 |
| 2006/0129283 | A1 * | 6/2006 | Alewine | G07C 5/008 | 701/1 |
| 2010/0256852 | A1 * | 10/2010 | Mudalige | G08G 1/163 | 701/24 |
| 2012/0078944 | A1 * | 3/2012 | Lloyd | G05B 23/027 | 707/769 |
| 2017/0339510 | A1 * | 11/2017 | Condeixa | H04L 67/10 | |
| 2018/0034873 | A1 * | 2/2018 | Brown | H04L 65/611 | |
| 2019/0371165 | A1 * | 12/2019 | Tokunaga | H04W 4/40 | |
| 2021/0125501 | A1 * | 4/2021 | Zhao | G05D 1/0295 | |
| 2021/0166566 | A1 * | 6/2021 | Cuevas Ramirez | H04W 84/02 | |
| 2022/0114433 | A1 * | 4/2022 | Lu | G05D 1/0248 | |

FOREIGN PATENT DOCUMENTS

| | | | |
|---|---|---|---|
| DE | 10 2017 215 710 | A1 | 3/2019 |
| DE | 10 2019 002 164 | A1 | 10/2020 |
| DE | 10 2023 001 620 | A1 | 10/2024 |

* cited by examiner

*Primary Examiner* — Liang Che A Wang

(74) *Attorney, Agent, or Firm* — STAAS & HALSEY LLP

(57) ABSTRACT

A plurality of vehicles request respective data packets, each containing different data sections, from a stationary server and vehicle. In response, the stationary server transmits data packets to the vehicles.

13 Claims, 1 Drawing Sheet

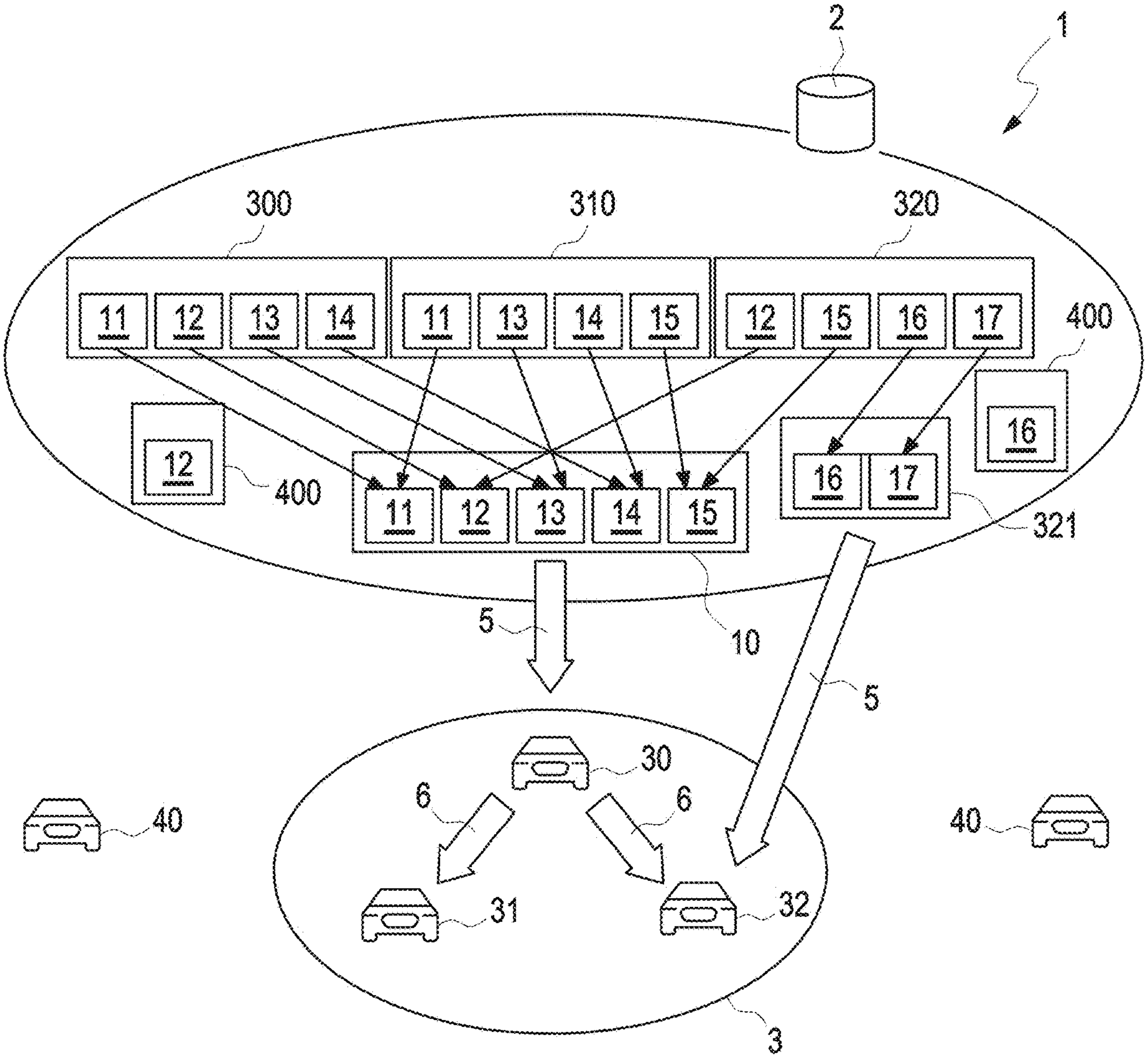
2
1
300
310
320
11
12
13
14
11
13
14
15
12
15
16
17
400
16
12
400
11
12
13
14
15
16
17
321
5
10
5
30
6
6
40
40
31
32
3

METHOD AND SYSTEM FOR TRANSMITTING DATA PACKETS

CROSS REFERENCE TO RELATED APPLICATIONS

This application is a based upon and claims the priority benefit of German Application No. 10 2024 103 847.0 filed on Feb. 12, 2024, the entire contents of which are incorporated by reference herein.

BACKGROUND

Described below is a method for transmitting data packets, wherein a plurality of vehicles request respective data packets, each containing different data sections, from a stationary server. Also described are a vehicle, a stationary server and a system for transmitting a data packet.

Normally, the stationary server transmits the data packets to the plurality of vehicles via a wireless network in order to update software stored in respective control units of the vehicles. Groups of vehicles, for example vehicles from the same model range, usually require matching data packets. If the stationary server transmits the same data packet to every vehicle in a group, the applicable data packet is transmitted redundantly.

To reduce redundancy in transmissions of data packets to vehicles, DE 10 2017 215 710 A1 and DE 10 2019 002 164 A1 each disclose a method in which a vehicle relays a data packet received from a stationary server via a first wireless network to other vehicles via a second wireless network. In this way, the stationary server is relieved of the burden of transmitting the data packet to the other vehicles itself, which is advantageous for several reasons. By way of example, costs of the data transmission or a load on the wireless network are/is reduced.

SUMMARY

Described below is a method for transmitting data packets that reduces redundancy in transmitted data further. Also described are a vehicle, a stationary server and a system for transmitting data packets.

Described below is a method for transmitting data packets, wherein a plurality of vehicles request respective data packets, each containing different data sections, from a stationary server. The stationary server is normally predetermined and can be operated by a manufacturer of the vehicles, in particular.

The stationary server supplies data for updating control units of the vehicles. Specifically, the supplied data can be used to update functional software of a control unit containing at least one processor, for example navigation software, or input data required by functional software of a control unit, for example a digital navigation map used by the navigation software.

First, a plurality of different requests are generated, each of which relates to a data packet containing different data sections. In this case, a data packet has a structure that is defined by a variety of data sections.

By way of example, a first data packet includes a first data section containing first functional software and a second data section containing input data required by the functional software. A second data packet can include a first section containing second functional software, which is different from the first functional software, and a second data section containing the input data of the second data section of the first data packet.

Accordingly, the first data packet and the second data packet differ in terms of the first data section and match in terms of the second data section. Conversely, two different data packets can match in terms of the first data section and differ in terms of the second data section. In both cases, a particular data section is readily transmitted redundantly if the stationary server transmits the first data packet and the second data packet.

Vehicles are particular mobile terminals. It goes without saying that the method can readily be applied to portable mobile terminals, for example smartphones, tablets or laptops.

The stationary server determines every data section that is repeatedly requested by an identified group of vehicles, the stationary server supplies a redundancy-free data packet exclusively containing every determined data section and the stationary server transmits the supplied redundancy-free data packet exclusively to an identified distributing vehicle included in the identified group by a transceiver communicating via a first wireless network. In other words, the stationary server does not transmit data packets requested by the identified group that have matching data sections. Instead, the stationary server forms a redundancy-free data packet, which includes every redundantly requested data section precisely once, and the stationary server transmits the redundancy-free data packet formed. Repeatedly is intended to be understood to mean at least twice.

Moreover, the stationary server transmits the redundancy-free data packet formed, in particular every data section that the redundancy-free data packet formed includes, precisely once. Simply by transmitting the data packet once, the stationary server ensures that the redundancy-free data packet is available to the identified group of vehicles. In this way, minimal redundancy in transmitted data is achieved based on the group of vehicles.

The vehicles in the identified group are generally different. Of course, vehicles in the identified group may belong to the same model range, or vehicles in the identified group may be produced by the same manufacturer.

It is noted that the method described above results, firstly, in vehicles in the group other than the distributing vehicle not yet receiving the redundancy-free data packet and, secondly, in at least one vehicle in the group not receiving every requested data section. Aside from this, at least one vehicle in the group can receive an unrequested data section.

The identified distributing vehicle may transmit the redundancy-free data packet to every remaining vehicle in the identified group via a second wireless network. In this way, every vehicle in the identified group receives the redundancy-free data packet. The second wireless network merely needs to connect the vehicles in the identified group and may in particular be able to be utilized more cost-effectively than the first wireless network or even at no cost. In this way, costs of redundant transmission are avoided.

Advantageously, every vehicle in the identified group determines a difference data packet containing particular requested data sections that the redundancy-free data packet does not include and requests the determined difference data packet from the stationary server. Requesting the difference data packet permits the vehicle to receive missing data sections of the requested data packet. The difference data packet may be empty, i.e. include no data section, if the redundancy-free data packet includes every data section of the requested data packet. In this case, the difference data packet naturally does not need to be requested. The difference data packet may be identical to the requested data packet, i.e. include every data section of the requested data packet, if the redundancy-free data packet includes no data section of the requested data packet.

Also advantageously, the stationary server supplies every requested difference data packet and the stationary server transmits every requested difference data packet to the particular requesting vehicle in the identified group by the first wireless network. In this way, every vehicle in the identified group receives every data section of the respective requested data packet. The costs of transmitting the difference data packets are unavoidable and also cannot be reduced, because the difference data packets include exclusively such data packets that have been requested by the vehicles in the identified group precisely once.

Every vehicle in the identified group can erase every unrequested data section of the redundancy-free data packet. The received redundancy-free data packet can include every data section of the requested data packet. The redundancy-free data packet can include no data section of the requested data packet. Every data section erased by a vehicle in the identified group has been transmitted by the second wireless network unnecessarily. The unnecessary transmission of erased data sections may be more cost-effective than redundant transmission of data sections by the first wireless network.

To avoid unnecessary transmissions of data sections within the identified group of vehicles, the distributing vehicle can, for every remaining vehicle in the identified group, supply a specific partial data packet that includes exclusively the data sections of the redundancy-free data packet that are requested by the remaining vehicle. In other words, before transmitting the redundancy-free data packet to a remaining vehicle in the identified group, the distributing vehicle can erase every data section not requested by the remaining vehicle from the redundancy-free data packet in order to form the specific partial data packet. The specific partial data packet may be empty and does not need to be transmitted if the remaining vehicle has not requested a data section of the redundancy-free data packet.

In one embodiment, the stationary server transmits the redundancy-free data packet and every difference data packet via a mobile radio network as the first wireless network. Utilizing the mobile radio network generally occasions relatively high costs.

In another embodiment, the distributing vehicle transmits the redundancy-free data packet via a V2X network, a WLAN network or a Bluetooth network as the second wireless network. The list of second wireless networks is illustrative and not exhaustive. In particular, the second wireless network can also include access points for stationary infrastructure devices that are arranged in a physical area of the vehicles in the identified group. Utilizing the second wireless network may be more cost-effective than utilizing the first wireless network, or free of charge.

Ideally, the stationary server identifies a group of vehicles on the basis of relative distances between the vehicles and on the basis of second wireless networks provided by the vehicles. Factors for a vehicle's belonging to an identified group include a physical proximity to and a wireless communication capability with other vehicles in the identified group. The stationary server receives position data and connection information relating to the second wireless network from all vehicles and identifies the group on the basis of the received position data and connection information.

The stationary server can identify the distributing vehicle on the basis of a connection quality of the first wireless network. The higher the connection quality, for example quality of service, QoS, the shorter a transmission time for the redundancy-free data packet may be. The lower the connection quality, the lower the costs that transmission of the redundancy-free data packet may occasion. The stationary server can take into account the transmission time and the costs, in particular can weigh them up, when identifying the distributing vehicle.

It goes without saying that the stationary server can identify a plurality of groups of vehicles. In this case, which is relevant in practice, the method is carried out for every identified group in parallel.

As described below, a vehicle includes a communication unit for communicating via a first wireless network and a second wireless network. The vehicle is configured to carry out the method described herein, using a stationary server and other vehicles. The vehicle permits additionally reduced redundancy in transmitted data.

The stationary server includes a communication unit for communicating via a wireless network, which is referred to as a first wireless network here. The stationary server is configured to carry out the method, described below, for a plurality of vehicles. The stationary server permits additionally reduced redundancy in transmitted data.

Also described below is a system for transmitting data packets using a plurality of vehicles and a stationary server. Systems of this type are used and can easily be developed to use the method described herein, for example by a software update. Accordingly, there are many opportunities for implementation of such systems. The vehicles and the stationary server are each designed according to implement the method described below. The system permits additionally reduced redundancy in transmitted data.

An advantage of the method is that redundancy in transmitted data is reduced further. The additionally reduced redundancy occasions correspondingly reduced costs for transmitting data packets.

BRIEF DESCRIPTION OF THE DRAWINGS

These and other aspects and advantages will become more apparent and more readily appreciated from the following description of an exemplary embodiment with reference to the accompanying drawing which is a schematic view of a system for transmitting data packets.

DETAILED DESCRIPTION

Reference will now be made in detail to the preferred embodiments, examples of which are illustrated in the accompanying drawings, wherein like reference numerals refer to like elements throughout.

The drawing provides a schematic view of a system 1 an embodiment for transmitting data packets 300, 310, 320. The system 1 has a plurality of vehicles 30, 31, 32, 40 and a stationary server 2.

Every vehicle 30, 31, 32, 40 is configured to carry out a method according to an embodiment described below, together with the stationary server 2 and other vehicles 30, 31, 32, 40. The server 2 is configured to carry out the method described below together with the plurality of vehicles 30, 31, 32, 40. The system 1 as a whole is configured to transmit the data packets 300, 310, 320 by carrying out the method described below.

The vehicles 30, 31, 32, 40 request respective data packets 300, 310, 320, each containing different data sections 11, 12, 13, 14, 15, 16, 17, from the stationary server 2.

The stationary server 2 can identify a group 3 among the vehicles 30, 31, 32, 40 on the basis of relative distances between the vehicles 30, 31, 32, 40 and on the basis of second wireless networks 6 provided by the vehicles 30, 31, 32, 40. By way of illustration, the stationary server 2 identifies the group 3 formed by the vehicles 30, 31, 32. The vehicles 40 do not belong to the identified group, as they are too far away from the vehicles 30, 31, 32 and/or cannot communicate wirelessly with the vehicles 30, 31, 32.

The stationary server 2 determines every data section 11, 12, 13, 14, 15 that is repeatedly requested by the identified group 3 of vehicles 30, 31, 32, and supplies a redundancy-free data packet 10 exclusively containing every determined data section 11, 12, 13, 14, 15. The data packets 400 requested by the vehicles 40 are ignored when supplying the redundancy-free data packet 10, as the vehicles 40 do not belong to the identified group 3. The vehicles 40 also do not receive the redundancy-free data packet 10 transmitted by the stationary server 2. However, the vehicles 40 may belong to other groups identified by the stationary server 2 and may be involved in the method in this role.

The stationary server 2 can furthermore identify a distributing vehicle on the basis of a connection quality of the first wireless network 5. The stationary server 2 transmits the supplied redundancy-free data packet 10 exclusively to the identified distributing vehicle 30 in the identified group 3 via a first wireless network 5.

The identified distributing vehicle 30 can transmit the redundancy-free data packet 10 to every remaining vehicle 31, 32 in the identified group 3 via a second wireless network 6. The distributing vehicle 30 ideally transmits the redundancy-free data packet 10 via a V2X network, a WLAN network or a Bluetooth network as the second wireless network 6. Every vehicle 30, 31, 32 in the identified group 3 ideally erases every unrequested data section 12, 15 of the redundancy-free data packet 10. Furthermore, every vehicle 30, 31, 32 in the identified group 3 can determine a difference data packet 321 containing particular requested data sections 16, 17 that the redundancy-free data packet 10 does not include and can request the determined difference data packet 321 from the stationary server 2. In the example shown, only the vehicle 32 requests a difference data packet, specifically the difference data packet 321.

The stationary server 2 can supply every requested difference data packet 321 and transmit it to the particular requesting vehicle 30, 31, 32 in the identified group 3 via the first wireless network 5. The stationary server 2 may transmit the redundancy-free data packet 10 and every difference data packet 321 via a mobile radio network as the first wireless network 5.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

LIST OF REFERENCE SIGNS

1 system
2 stationary server
3 group
5 first wireless network
6 second wireless network
10 redundancy-free data packet
11 data section
12 data section
13 data section
14 data section
15 data section
16 data section
17 data section
30 vehicle, distributing vehicle
31 vehicle
32 vehicle
40 other vehicle
300 requested data packet
310 requested data packet
320 requested data packet
321 difference data packet
400 data packet

What is claimed is:

1. A method for transmitting data packets, comprising:

requesting, by a plurality of vehicles, respective data packets, each containing different data sections, from a stationary server;

determining, by the stationary server, each repeated data section that is repeatedly requested by an identified group of the plurality of vehicles;

supplying, by the stationary server, a redundancy-free data packet exclusively containing each repeated data section; and transmitting, from the stationary server via a first wireless network, the redundancy-free data packet exclusively to an identified distributing vehicle included in the identified group of the plurality of vehicles, wherein the identified distributing vehicle transmits the redundancy-free data packet to every remaining vehicle in the identified group via a second wireless network, wherein the method further comprises:

determining, by each of the vehicles in the identified group, a respective difference data packet containing particular requested data sections that the redundancy-free data packet does not include;

requesting the respective difference data packet from the stationary server by each of the vehicles in the identified group; and supplying, by the stationary server, the respective difference data packet to each of the vehicles in the identified group via the first wireless network.

2. The method according to claim 1, wherein each of the vehicles in the identified group erases every unrequested data section of the redundancy-free data packet.

3. The method according to claim 2, wherein the stationary server transmits the redundancy-free data packet and the respective difference data packet requested by each of the vehicles in the identified group via a mobile radio network as the first wireless network, and the identified distributing vehicle transmits the redundancy-free data packet via one of a V2X network, a WLAN network and a Bluetooth network as the second wireless network.

4. The method according to claim 3, wherein the stationary server identifies the identified group of the plurality of vehicles based on relative distances between the vehicles in the identified group and based on the second wireless network provided by the vehicles in the identified group.

5. The method according to claim 4, wherein the stationary server identifies the identified distributing vehicle based on a connection quality of the first wireless network.

6. The method according to claim 1, further comprising:

determining, by each of the vehicles in the identified group, a respective difference data packet containing particular requested data sections that the redundancy-free data packet does not include;

requesting the respective difference data packet from the stationary server by each of the vehicles in the identified group; and supplying, by the stationary server, the respective difference data packet to each of the vehicles in the identified group via the first wireless network.

7. The method according to claim 6, wherein said supplying the redundancy-free data packet and said supplying the respective difference data packet requested by each of the vehicles in the identified group includes transmitting via a mobile radio network as the first wireless network, and further comprising transmitting the redundancy-free data packet from the identified distributing vehicle to every remaining vehicle in the identified group via one of a V2X network, a WLAN network and a Bluetooth network.

8. The method according to claim 1, wherein each of the vehicles in the identified group erases every unrequested data section of the redundancy-free data packet.

9. The method according to claim 1, wherein the stationary server identifies the identified group of the plurality of vehicles based on relative distances between the vehicles in the identified group and based on second wireless networks provided by the vehicles in the identified group.

10. The method according to one of claim 1, wherein the stationary server identifies the identified distributing vehicle based on a connection quality of the first wireless network.

11. A vehicle communicating with a stationary server via a wireless network and communicating with other vehicles included in an identified group of vehicles, the vehicle comprising:

a transceiver communicating via the wireless network; and at least one processor programmed to:

request, from the stationary server, a data packet containing different data sections, and receive from the stationary server, a redundancy-free data packet exclusively containing each repeated data section repeatedly requested by the vehicle and the other vehicles, the other vehicles not receiving the redundancy-free data packet, wherein the vehicle transmits the redundancy-free data packet to every remaining vehicle in the identified group via a second wireless network, wherein the at least one processor is further programmed to:

determine, by each of the vehicles in the identified group, a respective difference data packet containing particular requested data sections that the redundancy-free data packet does not include;

request the respective difference data packet from the stationary server by each of the vehicles in the identified group; and supply, by the stationary server, the respective difference data packet to each of the vehicles in the identified group via a first wireless network.

12. A stationary server, communicating with a plurality of vehicles via a first wireless network, comprising:

a transceiver receiving requests from the plurality of vehicles for respective data packets, each containing different data sections; and at least one processor programmed to:

determine each repeated data section that is repeatedly requested by an identified group of the plurality of vehicles, supply a redundancy-free data packet exclusively containing each repeated data section repeatedly requested by the plurality of vehicles, and transmit, via the first wireless network, the redundancy-free data packet exclusively to an identified distributing vehicle included in the identified group of the plurality of vehicles, wherein the identified distributing vehicle transmits the redundancy-free data packet to every remaining vehicle in the identified group via a second wireless network, wherein the at least one processor is further programmed to:

determine, by each of the vehicles in the identified group, a respective difference data packet containing particular requested data sections that the redundancy-free data packet does not include;

request the respective difference data packet from the stationary server by each of the vehicles in the identified group; and supply, by the stationary server, the respective difference data packet to each of the vehicles in the identified group via the first wireless network.

13. A system for transmitting data packets, comprising:

a plurality of vehicles requesting respective data packets, each containing different data sections; and a stationary server configured to:

determine each repeated data section that is repeatedly requested by an identified group of the plurality of vehicles, supply a redundancy-free data packet exclusively containing each repeated data section repeatedly requested by the plurality of vehicles, and transmit, via a first wireless network, the redundancy-free data packet exclusively to an identified distributing vehicle included in the identified group of the plurality of vehicles, wherein the identified distributing vehicle transmits the redundancy-free data packet to every remaining vehicle in the identified group via a second wireless network, wherein the system is further configured to:

determine, by each of the vehicles in the identified group, a respective difference data packet containing particular requested data sections that the redundancy-free data packet does not include;

request the respective difference data packet from the stationary server by each of the vehicles in the identified group; and supply, by the stationary server, the respective difference data packet to each of the vehicles in the identified group via the first wireless network.

* * * * *